(12) United States Patent
Attila et al.

(10) Patent No.: US 8,768,499 B2
(45) Date of Patent: Jul. 1, 2014

(54) PRODUCTION INDEX INFORMATION GENERATING DEVICE, PROGRAM THEREFORE, AND PRODUCTION INFORMATION GENERATING METHOD

(75) Inventors: Lengyel Attila, San Jose, CA (US); Yoichi Nonaka, Yokohama (JP); Kadar Botond, Fujisawa (JP); Monostori Laszlo, Budapest (HU)

(73) Assignees: Hitachi, Ltd., Tokyo (JP); Computer and Automation Research Institute, Hungarian Academy of Sciences, Budapest (HU)

( * ) Notice: Subject to any disclaimer, the term of this patent is extended or adjusted under 35 U.S.C. 154(b) by 1026 days.

(21) Appl. No.: 12/833,186

(22) Filed: Jul. 9, 2010

(65) Prior Publication Data
US 2011/0009995 A1 Jan. 13, 2011

(30) Foreign Application Priority Data
Jul. 10, 2009 (JP) .................. 2009-163373

(51) Int. Cl.
*G06F 19/00* (2011.01)
*G06F 17/40* (2006.01)

(52) U.S. Cl.
USPC .............................. 700/108; 700/99; 702/187

(58) Field of Classification Search
None
See application file for complete search history.

(56) References Cited

U.S. PATENT DOCUMENTS

| 6,889,178 B1 | 5/2005 | Chacon |
| 2004/0153187 A1* | 8/2004 | Knight et al. .................. 700/99 |
| 2005/0055110 A1 | 3/2005 | Tuszynski |

FOREIGN PATENT DOCUMENTS

| JP | 6-069089 | 3/1994 |
| JP | 2004-280324 | 10/2004 |
| JP | 2008-152312 | 7/2008 |

OTHER PUBLICATIONS

JP Notification of Reasons for Refusal for Japanese Patent Application No. 2009-163373, issued on Mar. 12, 2013.
Taiwan Office Action; Application No. 099122793 dated Nov. 1, 2013.

* cited by examiner

*Primary Examiner* — Sean Shechtman
(74) *Attorney, Agent, or Firm* — Antonelli, Terry, Stout & Kraus, LLP.

(57) ABSTRACT

A control unit (120) of a production index information generating device (100) groups, based on log information of a production device, processing targets to generate groups for which end time of processing falls within a predetermined interval, classifies the processing targets contained in the groups into classes based on a number of the processing targets contained in each of the groups, generates cycle time information for each of the classes, which specifies cycle time of each of the processing targets contained in corresponding one of the classes, and determines a production capability of the production device. Accordingly, an index specifying a capability of the production device may be obtained with ease.

23 Claims, 16 Drawing Sheets

FIG. 2

| WAFER ID | PRODUCT TYPE ID | LOT ID | PROCESSING | START TIME | END TIME | DEVICE ID |
|---|---|---|---|---|---|---|
| 1 | X | A | ION MILLING | 2008/5/14 12:01 | 2008/5/14 13:35 | DEVICE a |
| 2 | X | A | ION MILLING | 2008/5/14 12:01 | 2008/5/14 13:35 | DEVICE a |
| ... | ... | ... | ... | ... | ... | ... |

FIG. 9

| STEP | PROCESSING | RATIO | "a" (SLOPE) | "b" (INTERCEPT) | POSSIBLE MOUNT NUMBER | DEVICE ID | PRODUCT TYPE ID |
|---|---|---|---|---|---|---|---|
| 1 | α | 100 | 2 | 0 | 1 | DEVICE a | X |
| 2 | β | 100 | 1.5 | 5 | 1 | DEVICE b | X |
| 3 | γ | 33 | 0 | 2 | 1 | DEVICE c | X |
| 3 | γ | 66 | 1.7 | 1 | 1 | DEVICE d | X |
| ... | ... | ... | ... | ... | ... | ... | ... |
| 10 | σ | 33 | 0 | 2 | 10 | DEVICE e | Y |
| 10 | σ | 33 | 0 | 2.2 | 8 | DEVICE f | Y |
| 10 | σ | 33 | 0 | 3 | 10 | DEVICE g | Y |
| ... | ... | ... | ... | ... | ... | ... | ... |

FIG. 11

| STEP | PROCESSING | RATIO | TYPE | "a" (SLOPE) | "b" (INTERCEPT) | POSSIBLE MOUNT NUMBER | DEVICE ID | PRODUCT TYPE ID |
|---|---|---|---|---|---|---|---|---|
| 1 | α | 100 | SINGLE | 2 | 0 | 1 | DEVICE a | X |
| 2 | β | 100 | MULTI | 1.5 | 5 | 1 | DEVICE b | X |
| 3 | γ | 33 | BATCH | 0 | 2 | 1 | DEVICE c | X |
| 3 | γ | 66 | MULTI | 1.7 | 1 | 1 | DEVICE d | X |
| ... | ... | ... | ... | ... | ... | ... | ... | ... |
| 10 | σ | 33 | BATCH | 0 | 2 | 10 | DEVICE e | Y |
| 10 | σ | 33 | BATCH | 0 | 2.2 | 8 | DEVICE f | Y |
| 10 | σ | 33 | BATCH | 0 | 3 | 10 | DEVICE g | Y |
| ... | ... | ... | ... | ... | ... | ... | ... | ... |

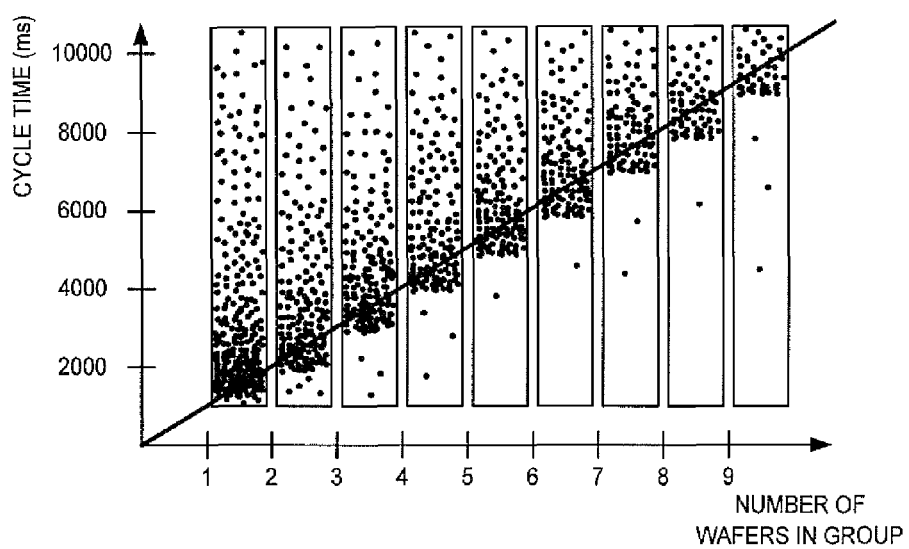

PRODUCTION INDEX INFORMATION GENERATING DEVICE, PROGRAM THEREFORE, AND PRODUCTION INFORMATION GENERATING METHOD

INCORPORATION BY REFERENCE

This application claims priority based on a Japanese patent application, No. 2009-163373 filed on Jul. 10, 2009, the entire contents of which are incorporated herein by reference.

BACKGROUND OF THE INVENTION

The present invention relates to a technology of generating information on production.

In production of semiconductors or the like, with regard to a product to be produced, a simulation is performed on production devices used in production processes, time required for each of the production devices, and the like, to thereby make a production plan (see, for example, U.S. Pat. No. 6,889,178).

When the simulation is performed for making the production plan, an operator needs to manually input, for example, indices specifying capabilities of the production devices used in the production processes, and task needs time and effort.

SUMMARY OF THE INVENTION

In view of this, it is an object of the present invention to obtain an index specifying a capability of a production device with ease.

In order to solve the above-mentioned problem, according to the present invention, an index specifying a capability of a production device is obtained based on log information of the production device.

For example, the present invention provides a storage unit which stores log information specifying a production device, processing targets processed by the production device, start time at which processing on the processing targets starts, and end time at which the processing on the processing targets ends, and a control unit. The control unit performs grouping of the processing targets identified by the log information, that the end time of the processing targets falls within a predetermined interval, processing of classifying the processing targets contained in the groups into classes based on a number of the processing targets contained in each of the groups, processing of generating cycle time information for each of the classes, which specifies cycle time of each of the processing targets contained in corresponding one of the classes, and processing of outputting the cycle time information to an output unit in a predetermined display form.

As described above, according to the present invention, the index specifying the capability of the production device can be obtained with ease.

BRIEF DESCRIPTION OF THE DRAWINGS

In the accompanying drawings:

FIG. 2 is a schematic log information table;

FIG. 9 is a schematic diagram of a production index information table;

FIG. 11 is a schematic diagram of a production index information table;

FIG. 17 is a schematic diagram of a cycle time information output screen.

DESCRIPTION OF THE PREFERRED EMBODIMENTS

Figure 1:
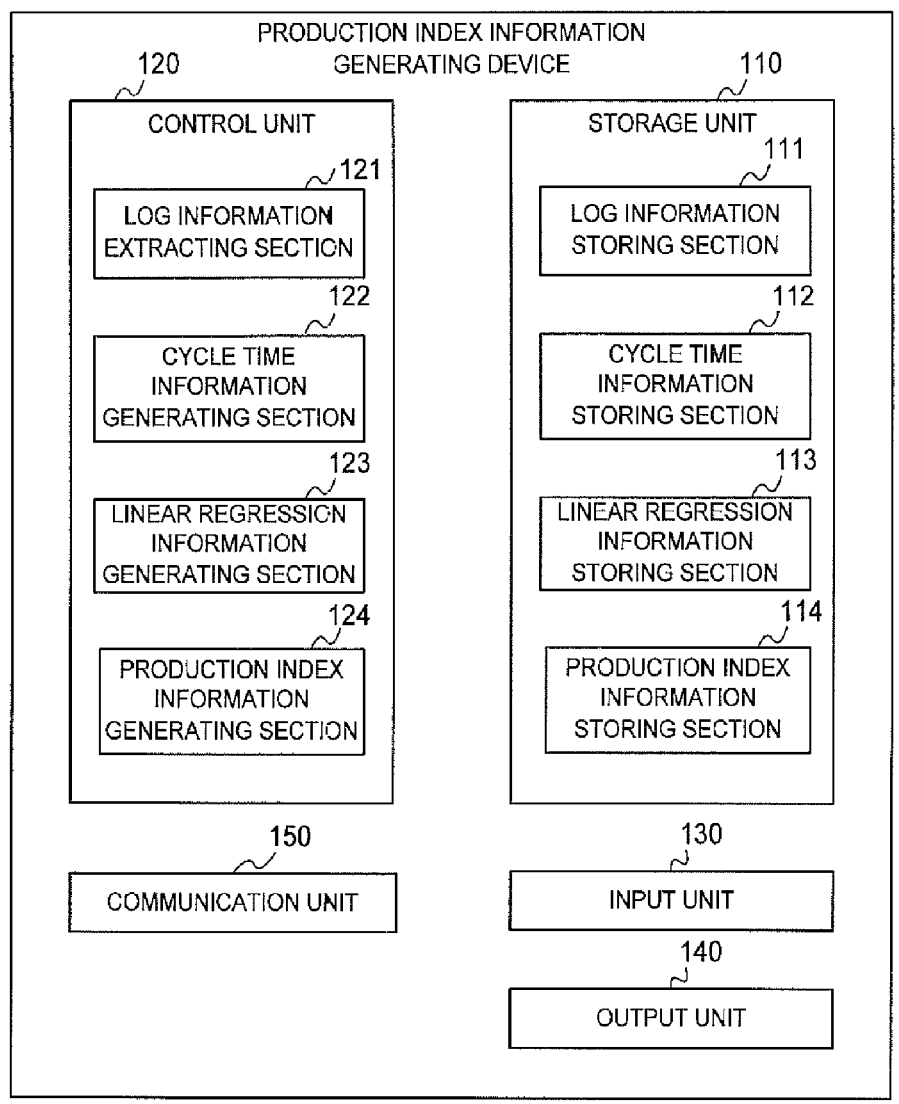
FIG. 1 is a schematic diagram of a production index information generating device.

FIG. 1 is a schematic diagram of a production index information generating device 100 according to a first embodiment of the present invention. As illustrated in FIG. 1, the production index information generating device 100 includes a storage unit 110, a control unit 120, an input unit 130, an output unit 140, and a communication unit 150.

The storage unit 110 includes a log information storing area 111, a cycle time information storing area 112, a linear regression information storing area 113, and a production index information storing area 114.

In the log information storing area 111, there is stored log information which specifies time at which a processing object (here, wafer) is set in a production device used in production equipment and time at which the production device ends processing on the processing object. For example, in this embodiment, a log information table 111a as illustrated in FIG. 2 (schematically illustrating the log information table 111a) is stored.

As illustrated in FIG. 2, the log information table 111a has a wafer ID column 111b, a product type ID column 111c, a lot ID column 111d, a processing column 111e, a start time column 111f, an end time column 111g, and a device ID column 111h.

In the wafer ID column 111b, there is stored information which specifies a wafer to be processed by a production device specified in the device ID column 111h described later. In this embodiment, as the information which specifies a wafer, a wafer ID serving as identification information for uniquely identifying wafers is stored.

In the product type ID column 111c, there is stored information which specifies a type of a product for which the wafer specified in the wafer ID column 111b is used. In this embodiment, as the information which specifies a type of a product, a product ID serving as identification information for uniquely identifying products is stored.

In the lot ID column 111d, there is stored information which specifies a lot containing the wafer specified in the wafer ID column 111b. In this embodiment, as the information which specifies a lot, a lot ID serving as identification information for uniquely identifying lots is stored.

In the processing column 111e, there is stored information which specifies processing to be performed for the wafer specified in the wafer ID column 111b by the production device specified in the device ID column 111h described later. In this embodiment, as the information which specifies processing, a name of each processing is stored.

In the start time column 111f, there is stored information which specifies time (here, year-month-day-time) at which the production device specified in the device ID column 111h described later starts the processing on the wafer specified in the wafer ID column 111b.

In the end time column 111g, there is stored information which specifies time (here, year-month-day-time) at which the production device specified in the device ID column 111h described later ends the processing on the wafer specified in the wafer ID column 111b.

In the device ID column 111h, there is stored information which specifies a production device which performs processing on the wafer specified in the wafer ID column 111b. In this embodiment, as the information which specifies a production device, a device ID serving as identification information for uniquely specifying production devices is stored.

In the cycle time information storing area 112, there is stored cycle time information which specifies cycle time of each of the wafers grouped for each of the production devices and the product types. It should be noted that the cycle time information is described in detail with reference to FIG. 6.

In the linear regression information storing area 113, there is stored linear regression information which specifies a regression line calculated by performing a linear regression analysis on the cycle time of each of the wafers grouped for each of the production devices and the product types. It should be noted that the linear regression information is described in detail with reference to FIG. 8.

In the production index information storing area 114, there is stored production index information which specifies a production capability of the production device for each of the product types. It should be noted that the production index information is described in detail with reference to FIG. 9.

The control unit 120 includes a log information extracting section 121, a cycle time information generating section 122, a linear regression information generating section 123, and a production index information generating section 124.

The log information extracting section 121 extracts log information for each of the production devices and the product types from the log information table 111a stored in the log information storing area 111.

The cycle time information generating section 122 groups the wafers on which processing has ended within a predetermined period of time based on the log information extracted by the log information extracting section 121. Then, the cycle time information generating section 122 generates the cycle time information by classifying the cycle time of each of the wafers in a group based on the number of the wafers contained in the group, and then stores the cycle time information in the cycle time information storing area 112.

The linear regression information generating section 123 specifies a reference value from values of the cycle time classified based on the number of the wafers contained in the group, according to the cycle time information generated by the cycle time information generating section 122. Then, the linear regression information generating section 123 performs the linear regression analysis on the specified reference value to calculate the regression line. Subsequently, the linear regression information generating section 123 generates the linear regression information which specifies the calculated regression line, and stores the linear regression information in the linear regression information storing area 113.

The production index information generating section 124 generates the production index information which specifies the production capability of the production device based on the linear regression information generated by the linear regression information generating section 123, and stores the production index information in the production index information storing area 114.

The input unit 130 receives an input of information.

The output unit 140 outputs information.

The communication unit 150 performs transmission/reception of information via a network.

Figure 3:
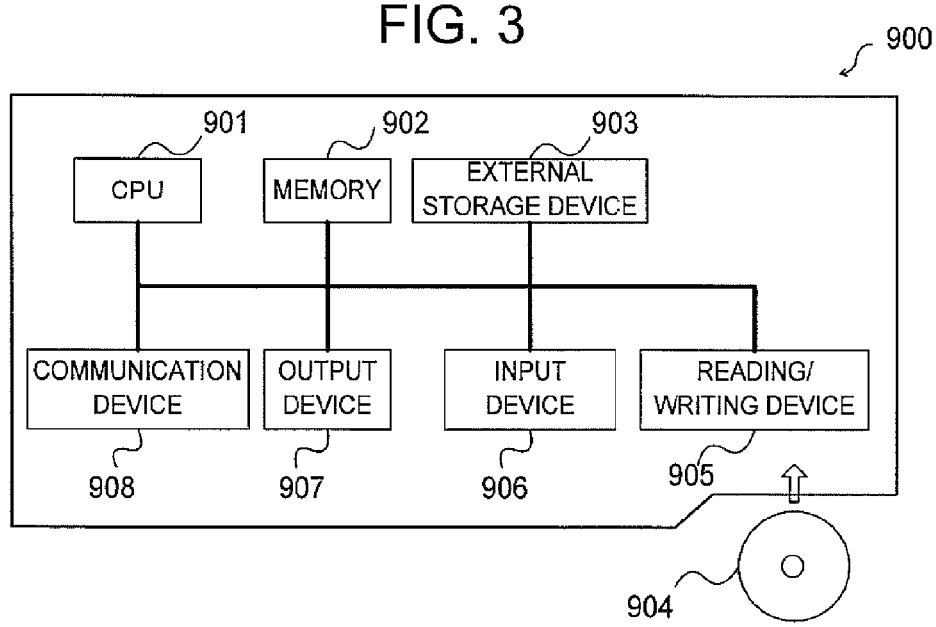
FIG. 3 is a schematic diagram of a computer.

The production index information generating device 100 described above may be realized by a general computer 900 as illustrated in FIG. 3 (schematic diagram illustrating the computer 900), which includes, for example, a central processing unit (CPU) 901, a memory 902, an external storage device 903 such as a hard disk drive (HDD), a reading/writing device 905 which reads/writes information from/to a portable storage medium 904 such as a compact disk (CD) or a digital versatile disk (DVD), an input device 906 such as a keyboard or a mouse, an output device 907 such as a display, and a communication device 908 for connecting to a communication network, such as a network interface card (NIC).

For example, the storage unit 110 may be realized by the CPU 901 using the memory 902 or the external storage device 903. The control unit 120 may be realized by loading a predetermined program stored in the external storage device 903 into the memory 902 and by making the CPU 901 execute the program. The input unit 130 may be realized by the CPU 901 using the input device 906. The output unit 140 may be realized by making the CPU 901 use the output device 907. The communication unit 150 may be realized by making the CPU 901 use the communication device 908.

The predetermined program may be downloaded from the storage medium 904 via the reading/writing device 905 or from the network via the communication device 908 into the external storage device 903, then loaded into the memory 902, and, after that, executed by the CPU 901. Further, the predetermined program may be loaded directly into the memory 902 from the storage medium 904 via the reading/writing device 905 or from the network via the communication device 908 and executed by the CPU 901.

Figure 4:
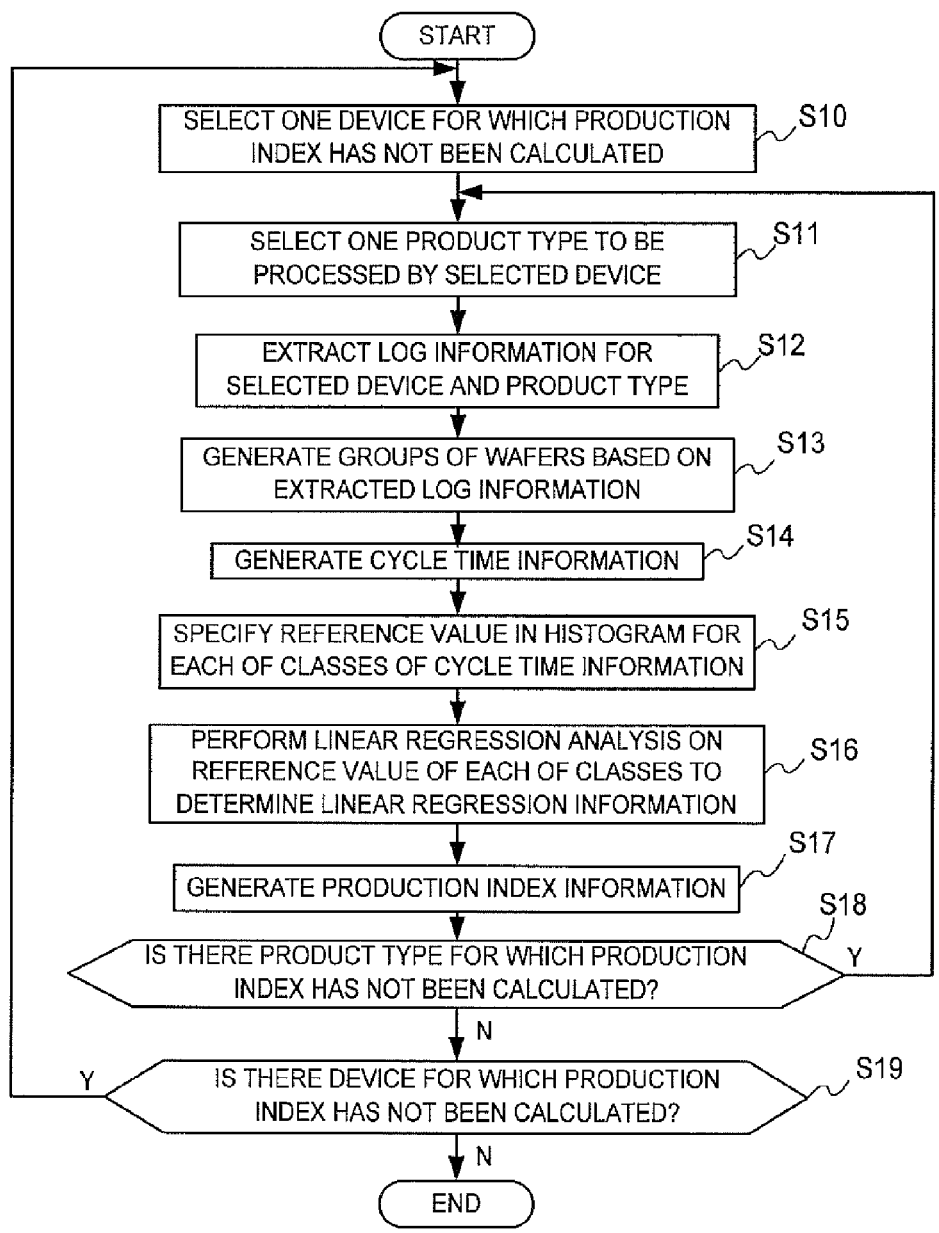
FIG. 4 is a flowchart illustrating processing performed by the production index information generating device.

FIG. 4 is a flowchart illustrating processing performed by the production index information generating device 100.

First, in the log information table 111a stored in the log information storing area 111, the log information extracting section 121 of the production index information generating device 100 specifies, from the device ID column 111h, one device ID corresponding to a production device for which production index information in Step S18 described later has not yet been generated (S10).

Subsequently, in the log information table 111a, the log information extracting section 121 specifies one product type ID corresponding to a product type for which the production index information in Step S18 described later has not yet been generated, from product type IDs stored in the product type ID column 111c of records having the device ID specified in Step S10 stored in the device ID column 111h (S11).

Subsequently, the log information extracting section 121 extracts, as the log information, information pieces stored in the all columns of records having the device ID specified in Step S10 and the product type ID specified in Step S11 stored in the device ID column 111h and the product type ID column 111c, respectively (S12).

It should be noted that, the log information extracting section 121 may generate, based on the log information extracted in Step S12, throughput information which specifies a wafer on which processing has been ended and the cumulative number of times the processing has been performed at a time point of the end of the processing (throughput) after a predetermined start time point.

Figure 5:
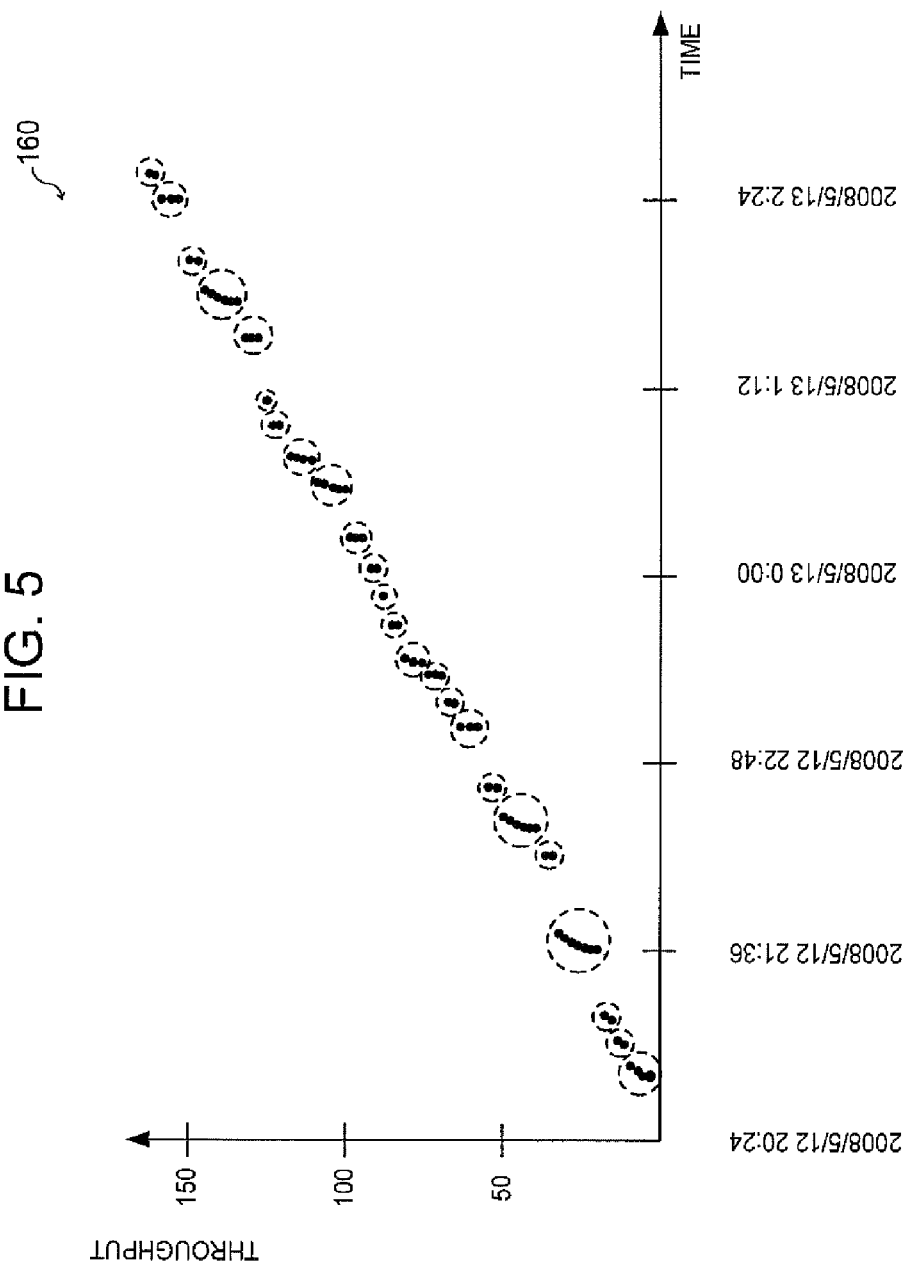
FIG. 5 is a schematic diagram of a throughput information output screen.

For example, the log information extracting section 121 generates a graph such as a throughput information output screen 160 as illustrated in FIG. 5 (schematic diagram illustrating the throughput information output screen 160). In the graph, an x-axis (axis of abscissa) represents certain time (here, year-month-day-time) elapsed after the predetermined start time point, and a y-axis (axis of ordinate) represents the throughput (cumulative number of times the processing has been performed) of the wafer on which the processing has been ended. The throughput information may be represented by drawing a point at a position which has an x-coordinate value corresponding to the end time of the log information and a y-coordinate value corresponding to the throughput of the wafer after the predetermined start time point.

Subsequently, in the log information extracted in Step S12, the cycle time information generating section 122 generates, from wafers identifying values of the end time stored in the end time column 111g in a continuous manner, a group of wafers identifying the continuous values of the end time successively fall below a predetermined threshold value (S13).

For example, the cycle time information generating section 122 generates a group based on wafers surrounded by the dashed lines of FIG. 5.

Subsequently, the cycle time information generating section 122 calculates cycle time of each of the wafers contained in each of groups obtained by grouping in Step S13, based on an interval between the start time stored in the start time column 111f and the end time stored in the end time column 111g in the log information, and generates cycle time information obtained by classifying the calculated cycle time of each of the wafers based on the number of the wafers contained in the group (S14).

Figure 6:
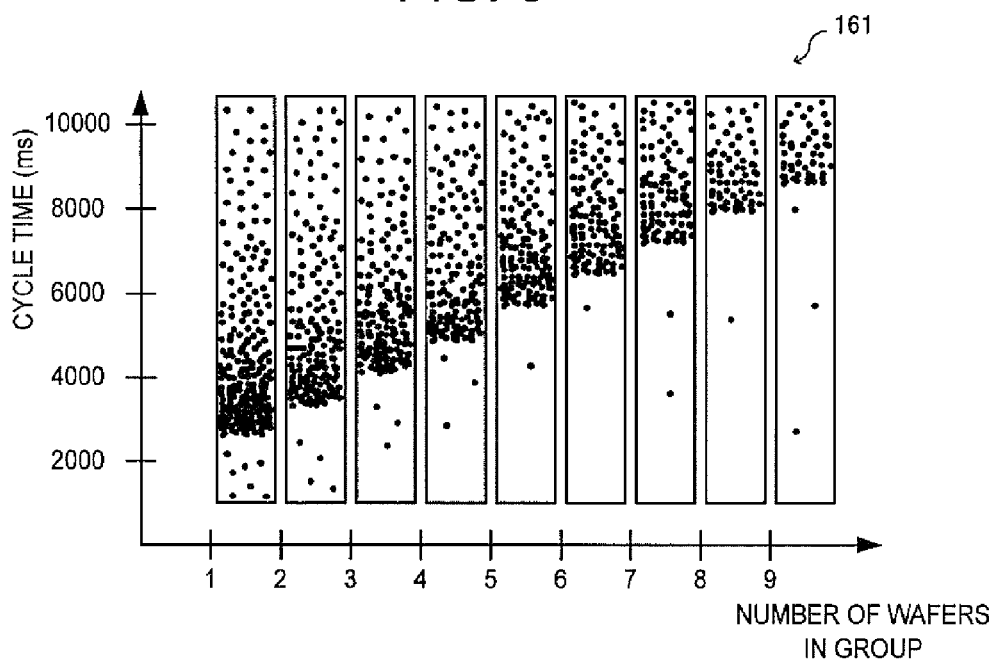
FIG. 6 is a schematic diagram of a cycle time information output screen.

For example, the cycle time information generating section 122 generates a graph such as a cycle time information output screen 161 as illustrated in FIG. 6 (schematic diagram illustrating the cycle time information output screen 161). In the graph, an x-axis (axis of abscissa) represents the number of wafers contained in the group, and a y-axis (axis of ordinate) represents the cycle time of the wafers. The cycle time information may be represented by drawing a point (drawing a point so that centers of points do not overlap with one another) at a position which is located in a rectangular region provided between the numbers of wafers adjacent to each other on the x-axis and corresponds to the cycle time of the wafer corresponding to any one of the numbers of wafers adjacent to each other on the axis of abscissa.

It should be noted that the cycle time information thus generated is stored in the cycle time information storing area 112 in association with the device ID and the product type ID specified in Steps S10 and S11, respectively.

Figure 7:
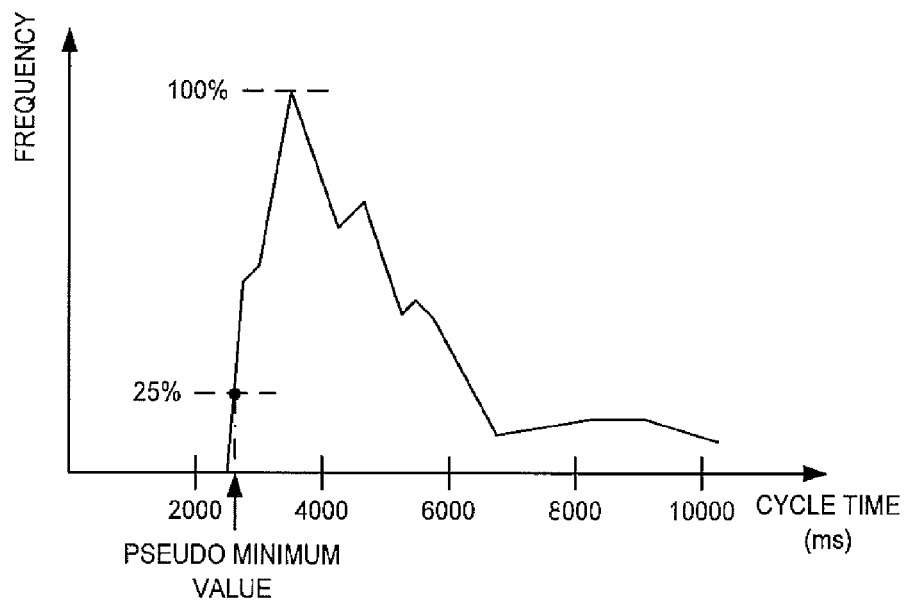
FIG. 7 is a histogram of cycle time of wafers.

Subsequently, the linear regression information generating section 123 generates, for each of classes based on the numbers of the wafers contained in the groups, a histogram (histogram of the cycle time and the number of wafers having the cycle time (frequency)) of the cycle time of the wafers contained in the class based on the cycle time information generated in Step S14 (see FIG. 7). The linear regression information generating section 123 specifies, as a reference value, a value of the cycle time which corresponds to the number of wafers which is smaller than the maximum number of wafers by a predetermined ratio (here, for example, 25 percents), and which is smaller than the cycle time corresponding to the maximum number of wafers (S15).

Step S15 is performed for removing input errors (noise components) of the start time and the end time in the log information. If there are no such errors, a value of the minimum cycle time of the wafers contained in each of the classes may be used as the reference value.

Subsequently, the linear regression information generating section 123 calculates a regression line by performing a linear regression analysis on the reference values specified in Step S15 (by, for example, the least square method) to generate linear regression information which specifies the calculated regression line (S16).

Figure 8:
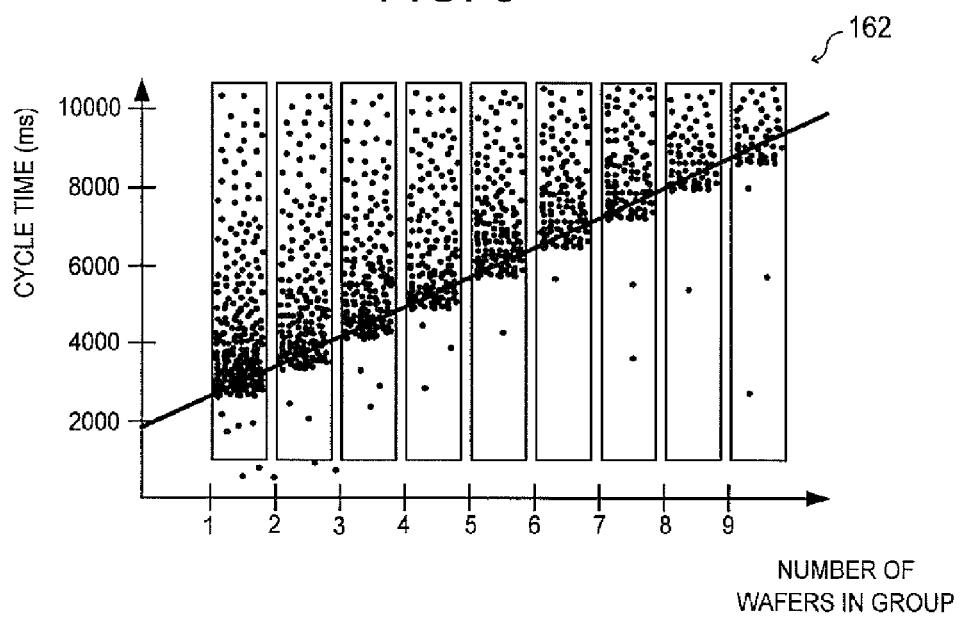
FIG. 8 is a schematic diagram of a linear regression information output screen.

For example, the linear regression information generating section 123 may generate the linear regression information by, as illustrated in FIG. 8 (schematic diagram illustrating a linear regression information output screen 162), plotting the reference values specified in Step S15 in the cycle time information output screen 161 as illustrated in FIG. 6 and drawing the regression line (approximate line) based on the plotted reference values.

It should be noted that the linear regression information thus generated is stored in the linear regression information storing area 113.

Subsequently, the production index information generating section 124 specifies a production index which indicates a production capability for each of product types and production devices, based on the log information extracted in Step S12, the cycle time information generated in Step S14, and the regression line specified in Step S16, and stores the production index as production index information, for example, in a production index information table 114a as illustrated in FIG. 9 (schematically illustrating the production index information table 114a) (S17).

As illustrated in FIG. 9, the production index information table 114a includes a step column 114b, a processing column 114c, a ratio column 114d, an "a" (slope) column 114e, a "b" (intercept) column 114f, a possible mount number column 114g, a device ID column 114h, and a product type ID column 114i.

In the step column 114b, there is stored information which specifies an order for setting a wafer in a production device specified in the device ID column 114h when a product of a product type specified in the product type ID column 114i described later is produced.

For example, the production index information generating section 124 specifies the order for setting the wafer in the production device based on the start time stored in the start time column 111f and the end time stored in the end time column 111g of the log information extracted in Step S12, and stores a number indicating the specified order in the step column 114b.

It should be noted that, when the production index information generating section 124 specifies the order for setting the wafer in the production device, in a case where one wafer and another wafer which are used for the same product type ID are set in production devices which are specified by different device IDs, the production index information generating section 124 assigns one number indicating the order by assuming that a plurality of production devices are used in one step.

In the processing column 114c, there is stored information which specifies processing performed by the production device specified in the device ID column 114h described later.

Here, the production index information generating section 124 stores, in the processing column 114c, the name of processing stored in the processing column 111e of the log information extracted in Step S12.

In the ratio column 114d, there is stored information which specifies a ratio of wafers set in the production device specified in the device ID column 114h described later when the product specified in the product type ID column 114i described later is manufactured, based on the log information extracted in Step S12.

For example, when the order for setting the wafer in the production device is specified, in a case where one wafer and another wafer which are used for the product having the same product type ID are set in production devices which are specified by different device IDs, a value less than 100 percents is stored in the ratio column 114d.

It should be noted that the production index information generating section 124 divides the number of wafers identifying that the device ID corresponding to the device ID column 114h described later is stored in the device ID column 111h in the log information extracted in Step S12 by the number of all of the wafers which are specified in the log information extracted in Step S12, and stores the ratio calculated by multiplying a result of the division by "100" in the ratio column 114d.

In the "a" (slope) column 114e, a value of a slope of the regression line calculated in Step S16 is stored.

In the "b" (intercept) column 114f, a value of a y-intercept of the regression line calculated in Step S16 is stored.

In the possible mount number column 114g, a value is stored as follows. If the value of the slope of the regression line calculated in Step S16 approximates "0" (falls within a range of 0±a predetermined threshold value), and, among classes shown in the cycle time information generated in Step S14, if there are the classes in each of which the number of groups where the wafers contained in each of the classes belong to is equal to or larger than a predetermined value, the maximum number of the wafers contained in the group is stored in the possible mount number column 114g. If the value of the slope of the regression line calculated in Step S16 does not approximate "0" (does not fall within a range of 0±the predetermined threshold value), "1" is stored.

In the device ID column 114h, the device ID selected in Step S10 is stored.

In the product type ID column 114i, the product type ID selected in Step S11 is stored.

Subsequently, with reference to FIG. 4 again, the log information extracting section 121 checks, based on the log information table 111a, whether there is a product which is included among products produced with the production device selected in Step S10 and for which the production index information has not been generated in Step S17 (S18). If true (Yes in Step S18), the process returns to Step S11 to repeat the processing. Otherwise (No in Step S18), the process proceeds to Step S19.

In Step S19, the log information extracting section 121 checks, based on the log information table 111a, whether there is a product device for which the production index information has not been generated in Step S17. If true (Yes in Step S19), the process returns to Step S10 to repeat the processing. Otherwise (No in Step S19), the processing is ended.

As described above, according to this embodiment, the production index for each of the products and the production devices may be determined from the log information with ease. Therefore, using such a production index enables a simulation for each of the products to be performed with ease.

For example, assume that a regression line for a product and a production device is represented by $y=ax+b$. By substituting the number of wafers per lot for x, as a value of y, cycle time per lot for this production device with respect to this product may be calculated. Then, by specifying production devices arranged in a line for manufacturing a product, cycle time of this product may be easily calculated as a whole.

Figure 10:
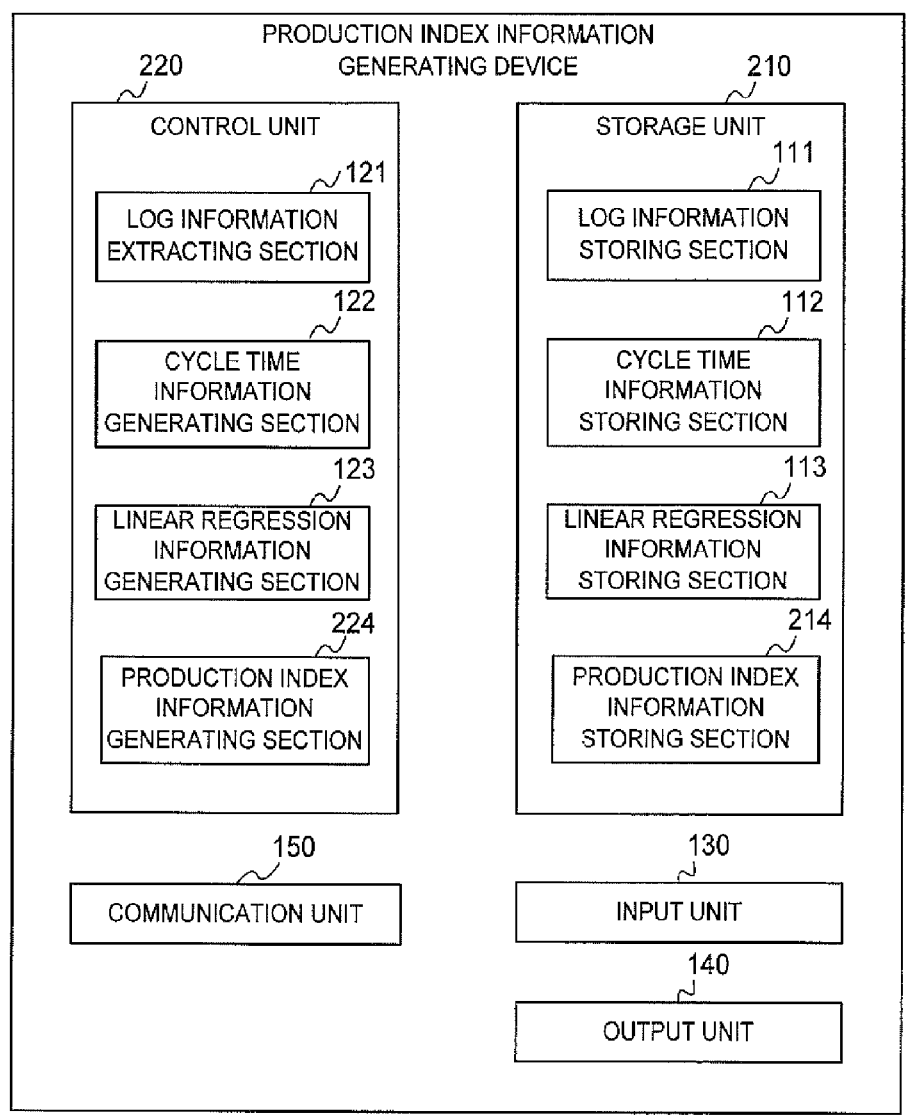
FIG. 10 is a schematic diagram of a production index information generating device.

FIG. 10 is a schematic diagram of a production index information generating device 200 according to a second embodiment of the present invention. As illustrated in FIG. 10, the production index information generating device 200 includes a storage unit 210, a control unit 220, the input unit 130, the output unit 140, and the communication unit 150.

The storage unit 210 includes the log information storing area 111, the cycle time information storing area 112, the linear regression information storing area 113, and a production index information storing area 214. The second embodiment is different from the first embodiment in terms of the production index information storing area 214. Therefore, a description is made of the production index information storing area 214.

In the production index information storing area 214, there is stored production index information which indicates a production capability for each of product types and production devices. For example, in this embodiment, a production index information table 214a is stored as illustrated in FIG. 11 (schematically illustrating the production index information table 214a).

The production index information table 214a includes a step column 214b, a processing column 214c, a ratio column 214d, a type column 214j, an "a" (slope) column 214e, a "b" (intercept) column 214f, a possible mount number column 214g, a device ID column 214h, and a product type ID column 214i. The production index information table 214a is different from the production index information table 114a according to the first embodiment in terms of the additional type column 214j. Therefore, a description is made below of information stored in the type column 214j.

In the type column 214j, there is stored information which specifies a type of processing performed on a processing target by a production device specified in the device ID column 214h.

Here, in this embodiment, as the information which specifies a type of processing, any one of the following three types of information is stored. The first type of information is "single", which indicates that the production device performs the processing on one processing target by one process. The second type of information is "multi", which indicates that the production device performs the processing on one processing target by a plurality of processes (production device performs the processing on a plurality of processing targets by a plurality of parallel processes). The third type of information is "batch", which indicates that the production device concurrently performs the processing on a plurality of processing targets.

With reference to FIG. 10 again, the control unit 220 includes the log information extracting section 121, the cycle time information generating section 122, the linear regression information generating section 123, and a production index information generating section 224. The second embodiment is different from the first embodiment in terms of processing performed by the production index information generating section 224. Therefore, a description is made of matters related to the processing performed by the production index information generating section 224.

The production index information generating section 224 according to this embodiment generates production index information similar to that of the first embodiment, and further classifies the processing types of the production devices and adds the processing types to the production index information.

Figure 12:
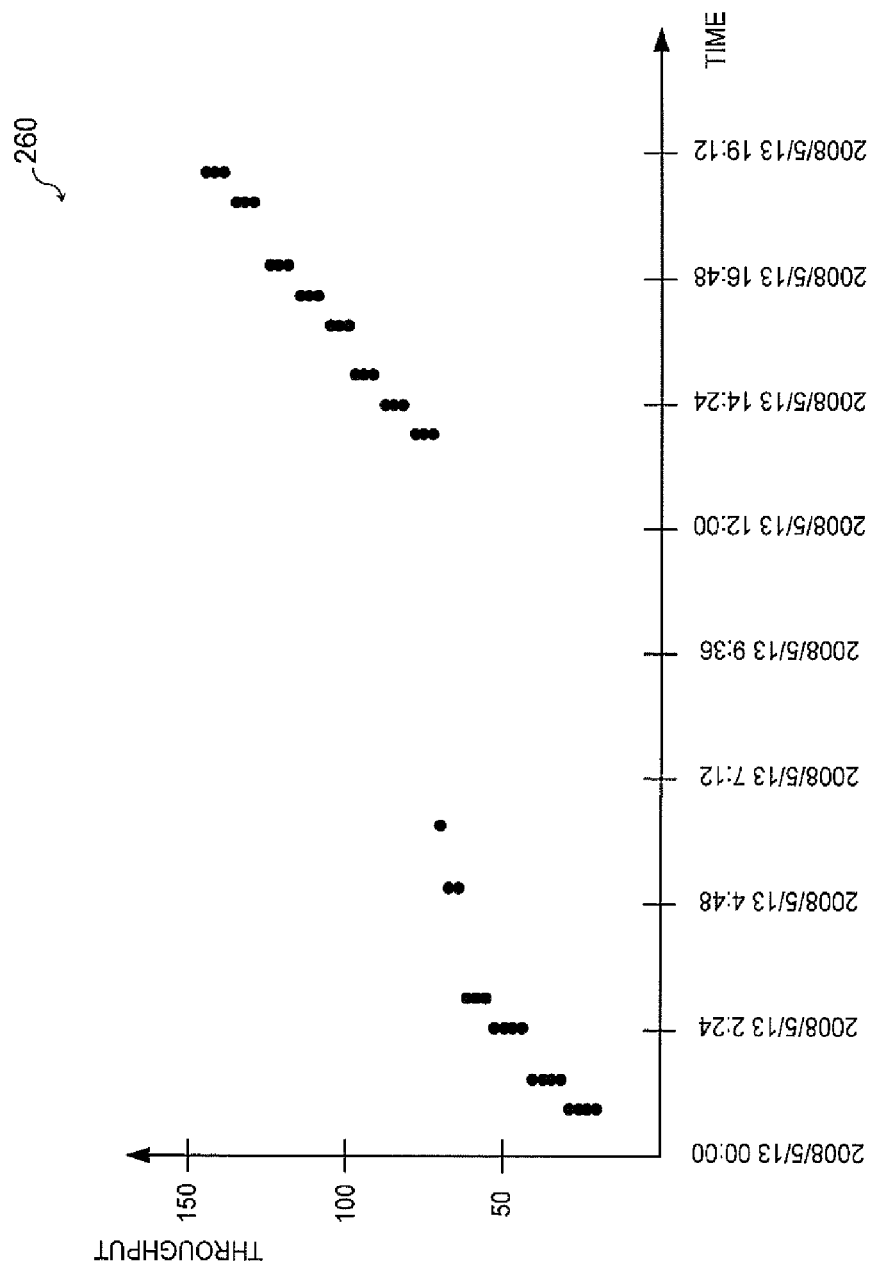
FIG. 12 is a schematic diagram of a throughput information output screen.

For example, based on the log information extracted from the log information table 111a by the log information extracting section 121 in association with a specific product and a specific production device, it is assumed that a plurality of wafers are output concurrently (in a certain narrow time range) as in a throughput information output screen 260 as illustrated in FIG. 12 (schematic diagram illustrating the throughput information output screen 260). In this case, in the cycle time information generated by the cycle time information generating section 122, values of the cycle time of the wafers, which is classified based on the number of the wafers in the group, are approximately constant regardless of the number of the wafers in the group, as in a cycle time information output screen 262 as illustrated in FIG. 13.

Figure 13:
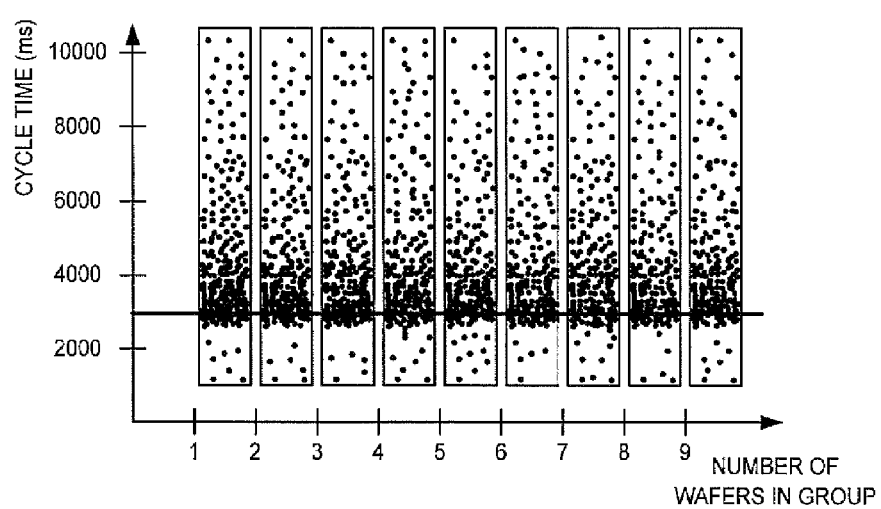
FIG. 13 is a schematic diagram of a cycle time information output screen.

In such a case, the regression line calculated by the linear regression information generating section 123 is, as illustrated in FIG. 13, a line approximately parallel to the x-axis (value of a slope thereof is in a range of "0"±a predetermined threshold value).

If such a regression line is calculated, the production index information generating section 224 stores a character string "batch" in the type column 214j of the production index information table 214a, "0" in the "a" (slope) column 214e, and a value of a y-intercept of the regression line in the "b" (intercept) column 214f. As for the possible mount number column 214g, in the cycle time information generated by the cycle time information generating section 122 classifying the cycle time based on the number of the wafers contained in the group, if there are the classes in each of which the number of groups where the wafers contained in each of the classes belong to is equal to or larger than a predetermined value, the maximum number of the wafers contained in the group is stored in the production index information generating section 224.

Figure 14:
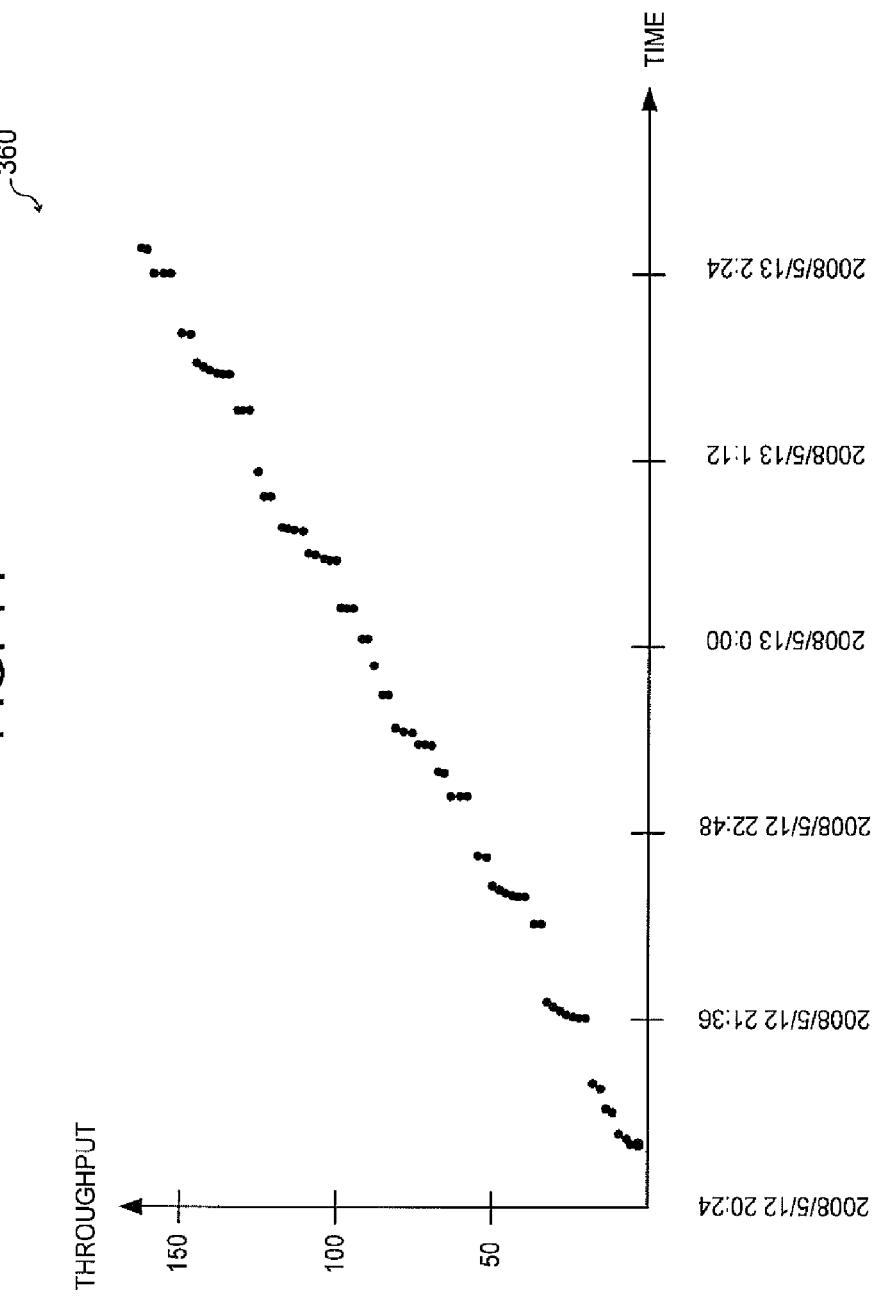
FIG. 14 is a schematic diagram of a throughput information output screen.

Further, based on the log information extracted from the log information table 111a by the log information extracting section 121 in association with a specific product and a specific production device, it is assumed that a plurality of wafers are output periodically and continuously as in a throughput information output screen 360 as illustrated in FIG. 14 (schematic diagram illustrating the throughput information output screen 360). In this case, the cycle time information is generated by the cycle time information generating section 122 as in a cycle time information output screen 362 as illustrated in FIG. 15.

Figure 15:
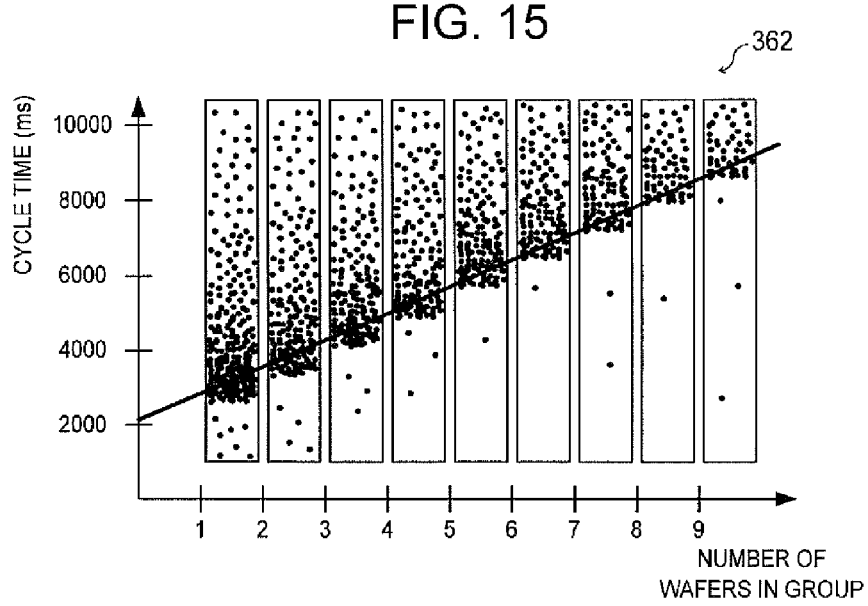
FIG. 15 is a schematic diagram of a cycle time information output screen.

In such a case, the regression line calculated by the linear regression information generating section 123 has, as illustrated in FIG. 15, a value of a slope larger than 0 and a value of a y-intercept larger than "0"+a predetermined threshold value.

If such a regression line is calculated, the production index information generating section 224 stores a character string "multi" in the type column 214j of the production index information table 214a, the value of the slope of the regression line in the "a" (slope) column 214e, the value of the y-intercept of the regression line in the "b" (intercept) column 214f, and "1" in the possible mount number column 214g.

Figure 16:
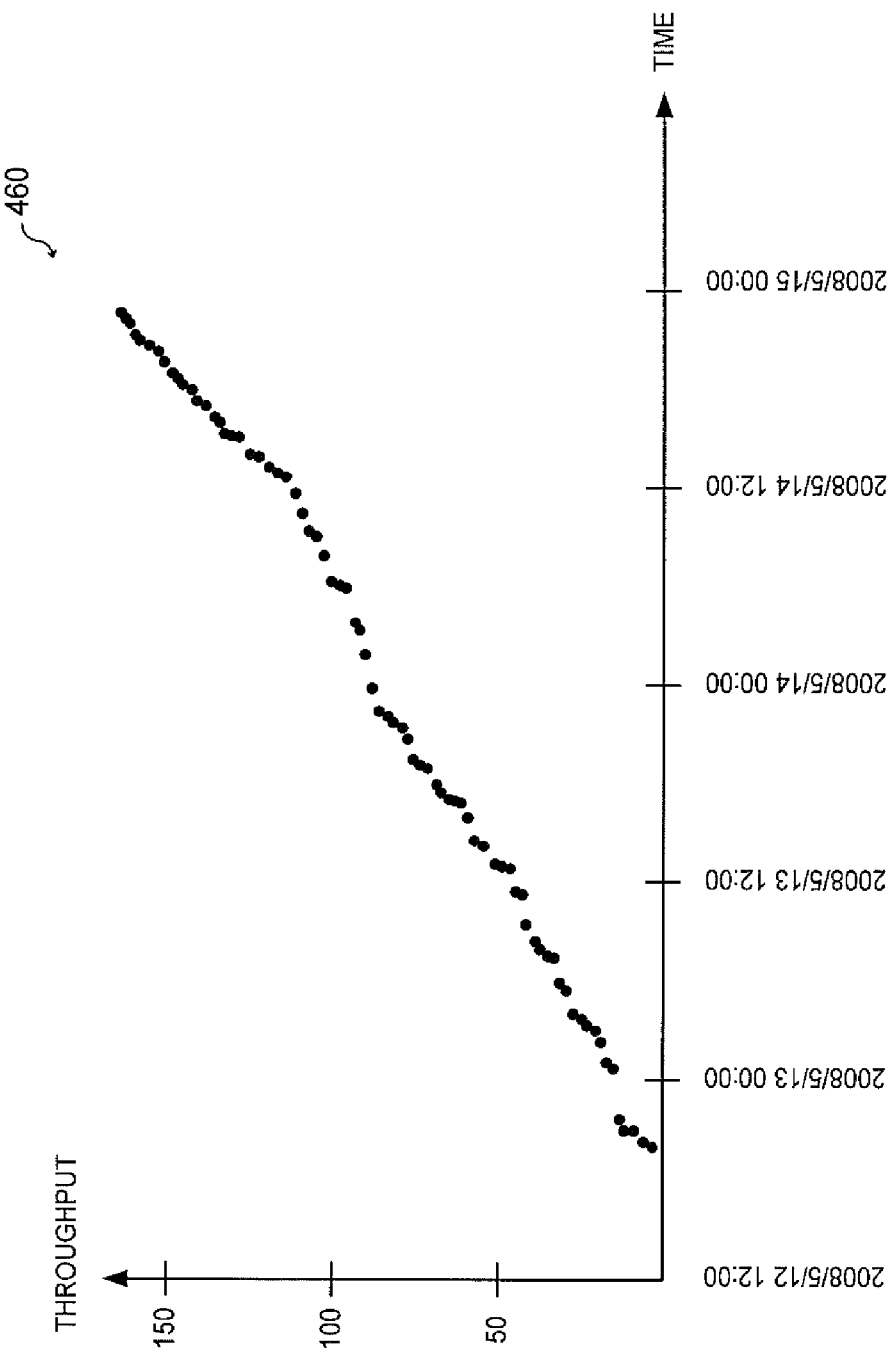
FIG. 16 is a schematic diagram of a throughput information output screen.

Further, based on the log information extracted from the log information table 111a by the log information extracting section 121 in association with a specific product and a specific production device, it is assumed that one wafer is output subsequently to another wafer as in a throughput information output screen 460 as illustrated in FIG. 16 (schematic diagram illustrating the throughput information output screen 460). In this case, the cycle time information is generated by the cycle time information generating section 122 as in a cycle time information output screen 462 as illustrated in FIG. 17.

In such a case, the regression line calculated by the linear regression information generating section 123 has, as illustrated in FIG. 17, a value of a slope larger than 0 and a value of a y-intercept of approximately "0" (within a range of "0"+a predetermined threshold value).

If such a regression line is calculated, the production index information generating section 224 stores a character string "single" in the type column 214j of the production index information table 214a, the value of the slope of the regression line in the "a" (slope) column 214e, "0" in the "b" (intercept) column 214f, and "1" in the possible mount number column 214g.

According to the second embodiment of the present invention, when a value stored in the "a" (slope) column 214e of the production index information table 214a is represented by "a"; a value stored in the "b" (intercept) column 214f is represented by "b"; and a value stored in the possible mount number column 214g is represented by "c", in a simulation for producing a product, for a product device specified in the device ID column 214h of a record having the character string "single" stored in the type column 214j of the production index information table 214a, cycle time $CT_{lot}$ per lot may be calculated with the following expression (1).

[Expression 1]

$$CT_{lot} = a \times \text{LotSize} \quad (1)$$

In the above expression, LotSize represents the number of wafers contained in a lot.

Further, for a product device specified in the device ID column 214h of a record having the character string "batch" in the type column 214j of the production index information table 214a, the cycle time $CT_{lot}$ per lot may be calculated with the following expression (2).

[Expression 2]

$$CT_{lot} = \text{Roundup}\left(\frac{\text{LotSize}}{c}\right) \times b \quad (2)$$

In the above expression, Roundup indicates that a number is rounded up to the closest whole number.

Further, for a product device specified in the device ID column 214h of a record having the character string "multi" in the type column 214j of the production index information table 214a, the cycle time $CT_{lot}$ per lot may be calculated with the following expression (3).

[Expression 3]

$$CT_{lot} = CT_{wafer} + (\text{LotSize} - 1) \times a \quad (3)$$

In the above expression, $CT_{wafer}$ represents a value of y when "1" is substituted for x in the regression line y=ax+b.

It should be noted that it is desirable that, first, the production index information generating section 224 judge whether or not the production device is a batch type, subsequently, judge whether or not the production device is a multi type, and, finally, judge whether or not the production device is a single type.

As described above, according to the second embodiment of the present invention, when the simulation of the production device is performed, the production index indicating the production capability may be obtained with ease based on the processing type of the production device.

In the above-mentioned embodiments, the production index information tables 114a and 214a are created. However, for example, outputting, to the output unit 140, the cycle time information output screen 161 as illustrated in FIG. 6 and the linear regression information output screen 162 as illustrated in FIG. 8 is sufficient to obtain the production index for understanding the production capability. Therefore, the processing may be ended by outputting any one of the cycle time information output screen 161 as illustrated in FIG. 6 and the linear regression information output screen 162 as illustrated in FIG. 8.

It should be noted that information to be stored in the log information storing area 111 of the storage units 110 and 210 may be obtained from a manufacturing execution system (MES) via a network or the like, or may be input by an operator via the input unit 130.

What is claimed is:

1. A computer-implemented production index information generating device, comprising:
a storage unit, configured to store log information, the log information including information that specifies:
a production device;
processing targets processed by the production device;
a start time, that indicates when processing on the processing targets starts; and
an end time, that indicates when processing on the processing targets ends; and
a control unit including a processor, configured to perform the following processing tasks:
group the processing targets identified by the log information, into a plurality of separate groups, such that the end times of processing targets in each group fall within predetermined threshold values;
classify the processing targets contained in the groups into classes based on a number of the processing targets contained in each of the groups;
generate cycle time information for each of the classes, which specifies a cycle time of each of the processing targets contained in corresponding one of the classes, wherein the cycle time is calculated based on an interval between the start time and the end time specified in the log information;
output the cycle time information to an output unit in a predetermined display form; and
based on the cycle time information, in a coordinate system having one axis representing the cycle time and another axis representing a number of the processing targets corresponding to the classes, the control unit selects, for each of the classes, cycle time which corresponds to one of the processing targets contained in a corresponding one of the classes, as a reference point, according to a predetermined criterion, to obtain reference points, determines a regression line of the reference points, and sets a slope and an intercept of the regression line as production index information of the production device.

2. A computer-implemented production index information generating device according to claim 1, wherein, if the slope of the regression line falls within a range between 0 and a predetermined threshold value, the control unit sets, in the production index information, information which indicates that the production device concurrently processes a plurality of processing targets.

3. A computer-implemented production index information generating device according to claim 1 or 2, wherein, if the slope of the regression line is larger than a predetermined threshold value and the intercept of the regression line falls within a range between 0 and a predetermined threshold value, the control unit sets, in the production index information, information which indicates that the production device processes one processing target by one process.

4. A computer-implemented production index information generating device according to any one of claims 1 to 2, wherein, if the slope of the regression line is larger than a predetermined threshold value and the intercept of the regression line is larger than a predetermined threshold value, the control unit sets, in the production index information, information which indicates that the production device processes one processing target by a plurality of processes.

5. A computer-implemented production index information generating device according to any one of claims 1 to 2, wherein, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

6. A computer-implemented production index information generating device according to any one of claims 1 to 2, wherein the control unit selects, as the reference point, a minimum value of the cycle time of the processing targets contained in each of the classes.

7. A computer-implemented production index information generating device according to claim 3, wherein, if the slope of the regression line is larger than a predetermined threshold value and the intercept of the regression line is larger than a predetermined threshold value, the control unit sets, in the production index information, information which indicates that the production computer-implemented device processes one processing target by a plurality of processes.

8. A computer-implemented production index information generating device according to any claim 3, wherein, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

9. A computer-implemented production index information generating device according to any claim 4, wherein, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

10. A computer-implemented production index information generating device according to claim 3, wherein the control unit selects, as the reference point, a minimum value of the cycle time of the processing targets contained in each of the classes.

11. A computer-implemented production index information generating device according to claim 4, wherein the control unit selects, as the reference point, a minimum value of the cycle time of the processing targets contained in each of the classes.

12. A program stored in a non-transitory computer-readable medium, and configured to control a computer, such that when the program is executed in a computer processor, the computer functions as:
   a storage unit, configured to store log information, including information that specifies:
      a production device;
      processing targets processed by the production device;
      a start time, that indicates when processing on the processing targets starts; and
      an end time, that indicates when processing on the processing targets ends; and
   a control unit including a processor, configured to:
      group the processing targets identified by the log information, into a plurality of separate groups, such that the end times of processing targets in each group fall within predetermined threshold values;
      classify the processing targets contained in the groups into classes based on a number of the processing targets contained in each of the groups;
      generate cycle time information for each of the classes, which specifies a cycle time of each of the processing targets contained in corresponding one of the classes, wherein the cycle time is calculated based on an interval between the start time and the end time specified in the log information; and
      output the cycle time information to an output unit in a predetermined display form; and
      based on the cycle time information, in a coordinate system having one axis representing the cycle time and another axis representing a number of the processing targets corresponding to the classes, the control unit selects, for each of the classes, cycle time which corresponds to one of the processing targets contained in a corresponding one of the classes, as a reference point, according to a predetermined criterion, to obtain reference points, determines a regression line of the reference points, and sets a slope and an intercept of the regression line as production index information of the production device.

13. A program stored in a non-transitory computer-readable medium according to claim 8, further controlling the control unit so that, if the slope of the regression line falls within a range between 0 and a predetermined threshold value, the control unit sets, in the production index information, information which indicates that the production device concurrently processes a plurality of processing targets.

14. A program stored in a non-transitory computer-readable medium according to claim 8 or 13, further controlling the control unit so that, if the slope of the regression line is larger than a predetermined threshold value and the intercept of the regression line falls within a range between 0 and a predetermined threshold value, the control unit sets, in the production index information, information which indicates that the production device processes one processing target by one process.

15. A program stored in a non-transitory computer-readable medium according to any one of claims 8 to 13, further controlling the control unit so that, if the slope of the regression line is larger than a predetermined threshold value and the intercept of the regression line is larger than a predetermined threshold value, the control unit sets, in the production index information, information which indicates that the production device processes one processing target by a plurality of processes.

16. A program stored in a non-transitory computer-readable medium according to any one of claims 8 to 13, further controlling the control unit so that, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

17. A program stored in a non-transitory computer-readable medium according to any one of claim 8 to 13, further controlling the control unit to select, as the reference point, a minimum value of the cycle time of the processing targets contained in each of the classes.

18. A program stored in a non-transitory computer-readable medium according to claim 14, further controlling the control unit so that, if the slope of the regression line is larger than a predetermined threshold value and the intercept of the regression line is larger than a predetermined threshold value, the control unit sets, in the production index information, information which indicates that the production device processes one processing target by a plurality of processes.

19. A program stored in a non-transitory computer-readable medium according to claim 14, further controlling the control unit so that, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

20. A program stored in a non-transitory computer-readable medium according to claim 15, further controlling the control unit so that, in a histogram having one axis representing the cycle time and another axis representing a number of the processing targets corresponding to the cycle time, the control unit sets, as the reference point, cycle time corresponding to a number of the processing targets, which is smaller than a maximum number of the processing targets by a predetermined ratio, the cycle time being smaller than cycle time corresponding to the maximum number of the processing targets.

21. A program stored in a non-transitory computer-readable medium according to claim 14, further controlling the control unit to select, as the reference point, a minimum value of the cycle time of the processing targets contained in each of the classes.

22. A program stored in a non-transitory computer-readable medium according to claim 15, further controlling the control unit to select, as the reference point, a minimum value of the cycle time of the processing targets contained in each of the classes.

23. A production information generating method performed by a computer-implemented production index information generating device, the computer-implemented production index information generating device including a control unit with a processor, and a storage unit configured to store log information, the log information including information that specifies a production device, processing targets processed by the production device, a start time that indicates when processing on the processing targets starts, and an end time that indicates when processing on the processing targets ends, the production information generating method comprising:
- grouping, by the control unit, the processing targets identified by the log information into a plurality of separate groups, such that the end times of processing targets in each group fall within predetermined threshold values;
- classifying, by the control unit, the processing targets contained in the groups into classes based on a number of the processing targets contained in each of the groups;
- generating, by the control unit, cycle time information for each of the classes, which specifies a cycle time of each of the processing targets contained in corresponding one of the classes, wherein the cycle time is calculated based on an interval between the start time and the end time specified in the log information;
- outputting, by the control unit, the cycle time information to an output unit in a predetermined display form; and
- based on the cycle time information, in a coordinate system having one axis representing the cycle time and another axis representing a number of the processing targets corresponding to the classes, the control unit selects, for each of the classes, cycle time which corresponds to one of the processing targets contained in a corresponding one of the classes, as a reference point, according to a predetermined criterion, to obtain reference points, determines a regression line of the reference points, and sets a slope and an intercept of the regression line as production index information of the production device.

* * * * *